United States Patent [19]
Bonniot

[11] Patent Number: 6,145,416
[45] Date of Patent: Nov. 14, 2000

[54] DRIVE TOOL EQUIPPED WITH A LOCKING MECHANISM

[75] Inventor: Frank Bonniot, Pougues les Eaux, France

[73] Assignee: Facom, Morangis, France

[21] Appl. No.: 09/325,020

[22] Filed: Jun. 3, 1999

[30] Foreign Application Priority Data

Jun. 4, 1998 [FR] France .................................. 98 07038

[51] Int. Cl.[7] .................................................. B25B 23/16
[52] U.S. Cl. ..................... 81/177.75; 81/177.8; 403/74
[58] Field of Search ............................. 81/177.75, 177.8, 81/177.85; 403/74, 365, 367

[56] References Cited

U.S. PATENT DOCUMENTS

| 1,102,863 | 7/1914 | Bojas ................................... 81/177.75 |
| 2,182,673 | 12/1939 | Magnano ............................... 81/177.8 |
| 2,436,336 | 2/1948 | Slater . |
| 4,614,457 | 9/1986 | Sammon . |
| 4,733,584 | 3/1988 | Karge . |
| 4,762,032 | 8/1988 | Chow ........................................... 81/63 |
| 4,936,701 | 6/1990 | Allen et al. . |
| 5,069,569 | 12/1991 | Lieser ........................................ 403/57 |
| 5,289,745 | 3/1994 | Beardsley . |
| 5,409,332 | 4/1995 | Chabot, Jr. et al. ..................... 403/114 |
| 5,433,548 | 7/1995 | Roberts et al. . |

FOREIGN PATENT DOCUMENTS

| 0 755 757 | 1/1997 | European Pat. Off. . |
| 2745384 | 5/1979 | Germany ............................. 81/177.75 |

Primary Examiner—Stephen F. Gerrity
Assistant Examiner—Hadi Shakeri
Attorney, Agent, or Firm—Wenderoth, Lind & Ponack, L.L.P.

[57] ABSTRACT

A tool includes an adapter for coupling to a rotary element such as a screwing/unscrewing socket. The adapter is equipped with a mechanism for locking the coupling. The lock mechanism is unlockable and normally locked. The tool further includes a main drive member for rotating the adapter, and the main drive member includes, for example, a ball-type universal joint. The lock mechanism is unlocked simply by a displacement of the main drive member towards the distal end of the adapter.

27 Claims, 7 Drawing Sheets

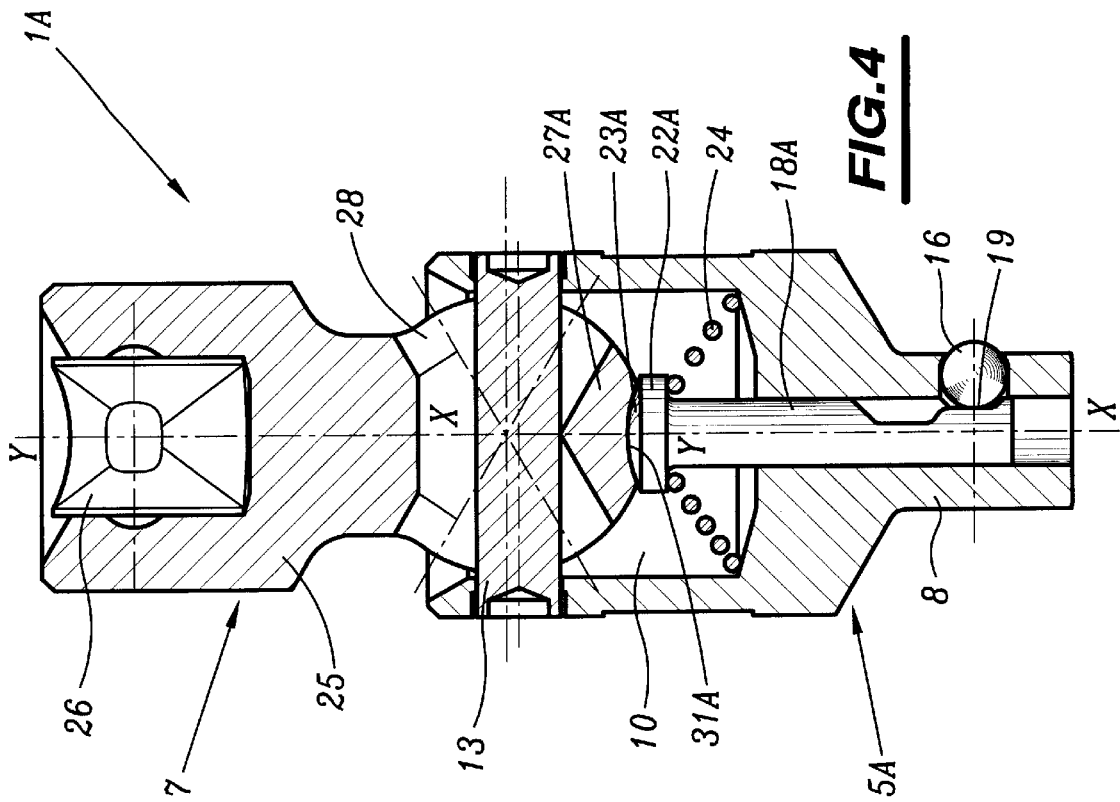
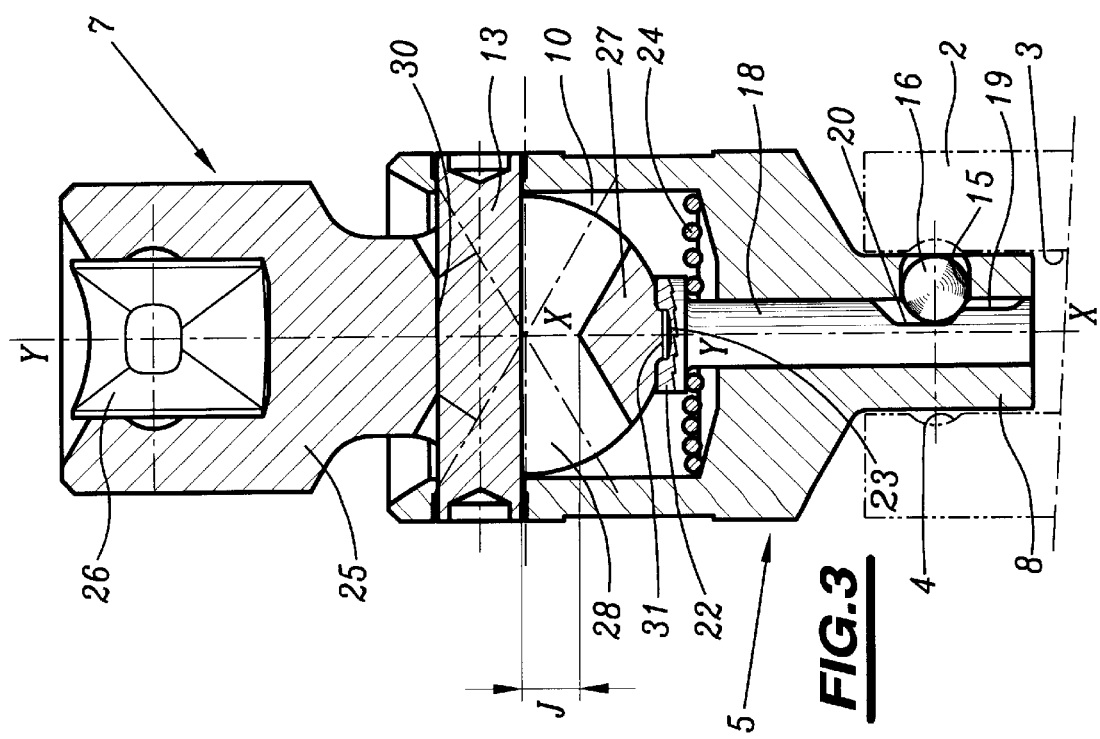

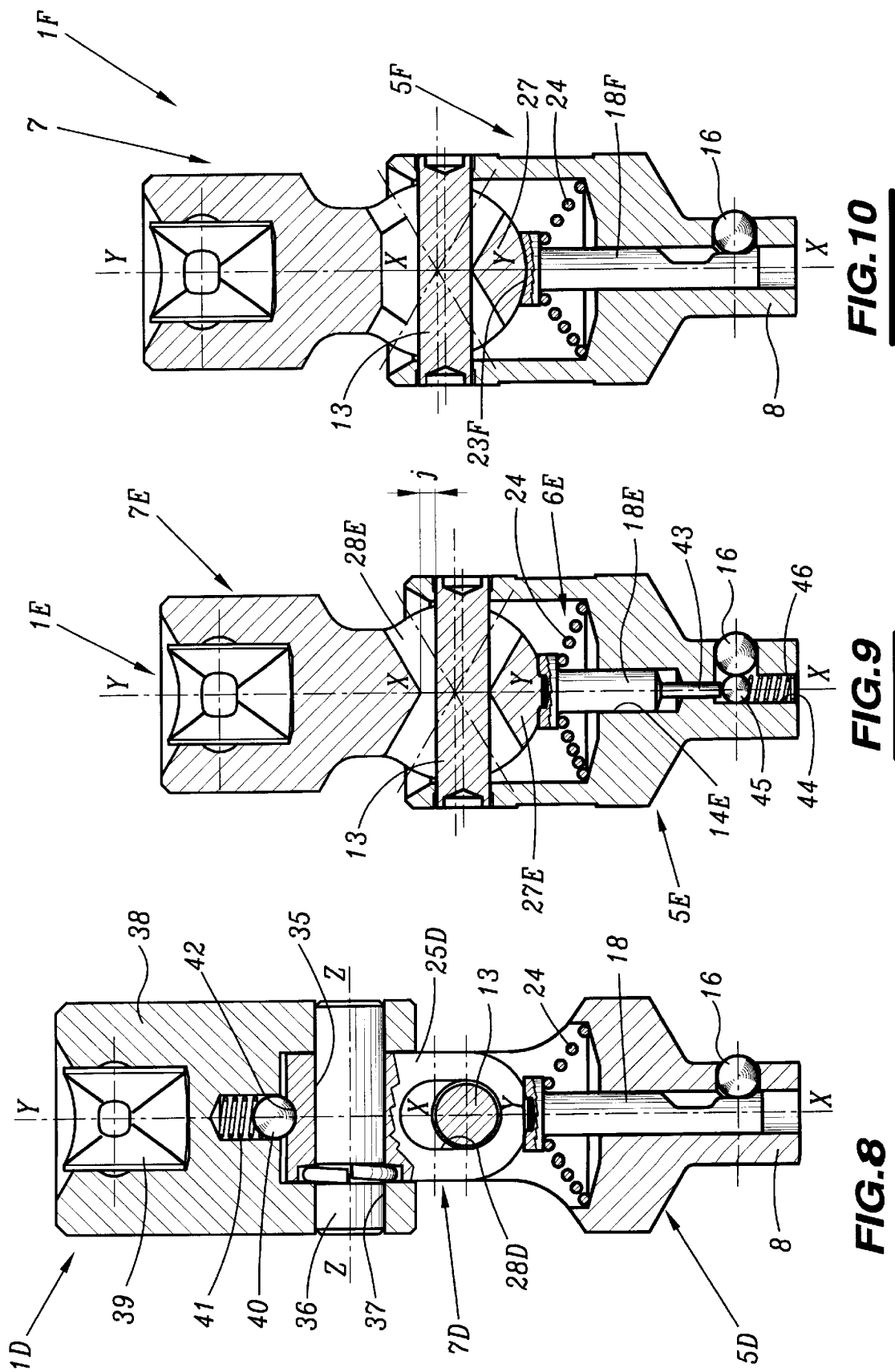

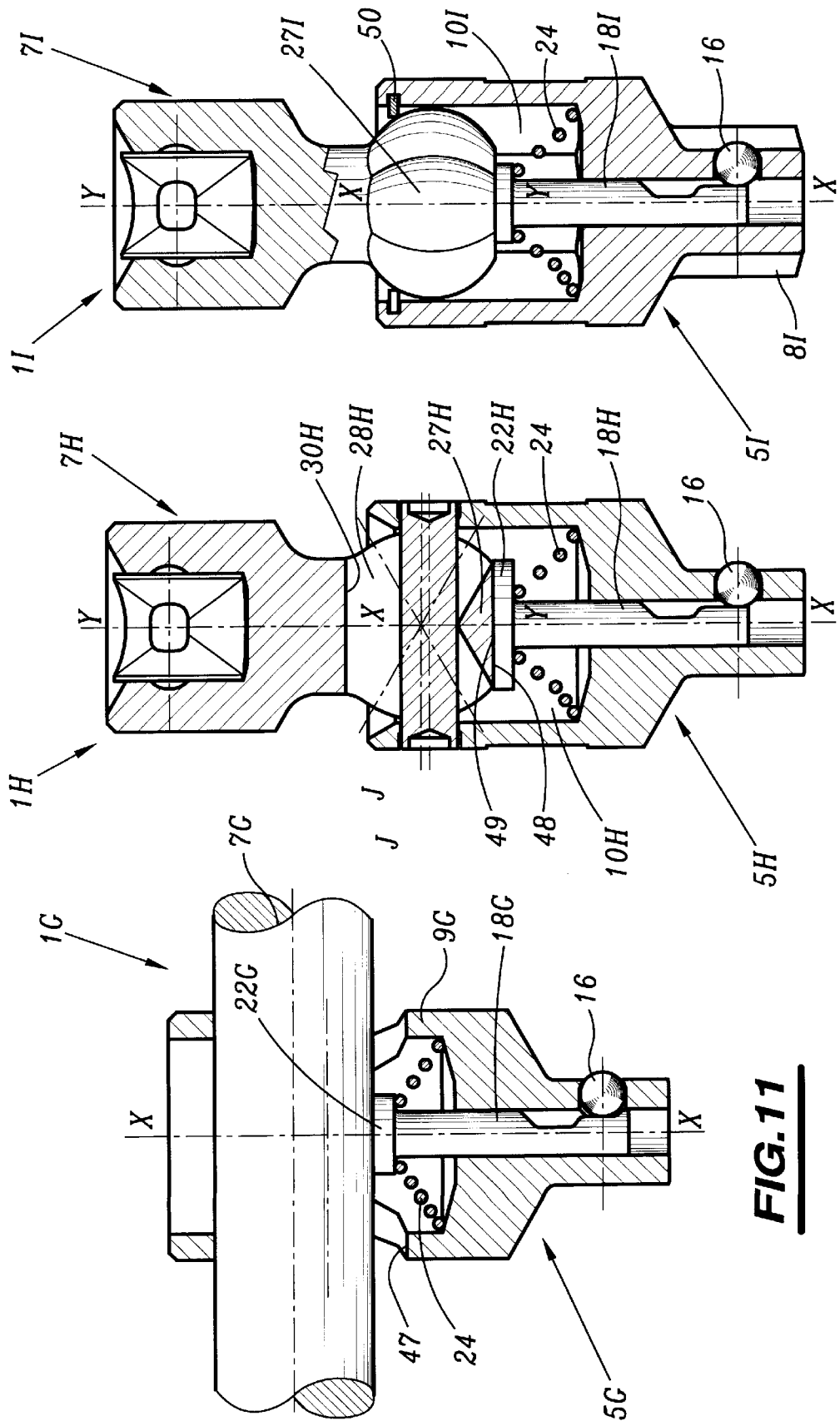

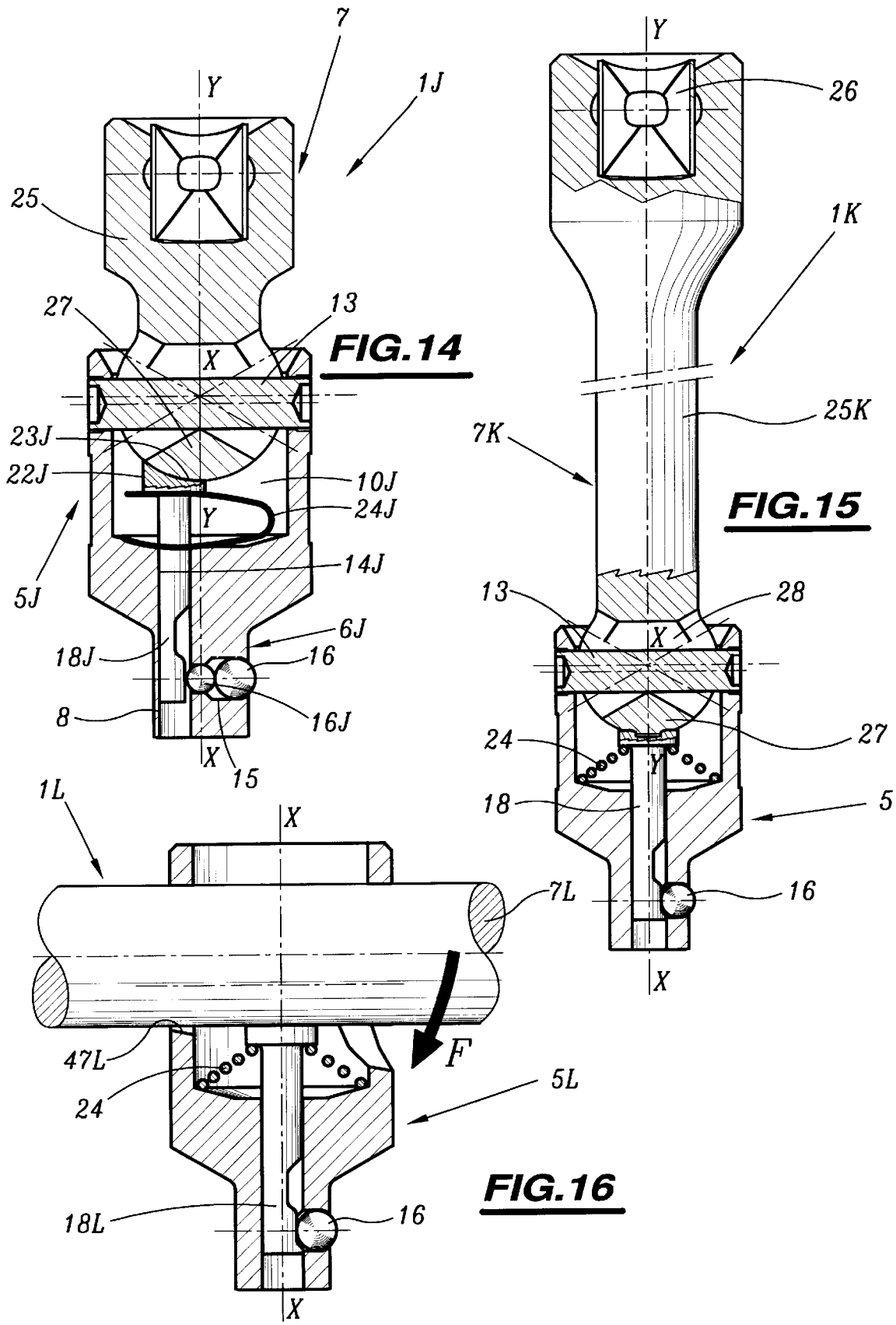

DRIVE TOOL EQUIPPED WITH A LOCKING MECHANISM

BACKGROUND OF THE INVENTION

The present invention relates to a tool for driving a rotary element, of the type comprising two main members, namely:

an adapter for coupling to the rotary element, this adapter being equipped with a mechanism for locking the coupling wherein the locking mechanism is unlockable and normally locked; and a main drive member for rotating the adapter.

The invention applies particularly to articulated tools such as universal joints used for the rotational drive of a screwing/unscrewing socket mounted on the adapter.

An example of a tool of this kind is described in U.S. Pat. No. 5,433,548. However, it has a relatively complicated structure because of the need to provide an additional piece dedicated to unlocking.

SUMMARY OF THE INVENTION

The object of the invention is to provide a tool which is particularly simple to produce, is robust and compact, and which allows the rotary element to clip automatically onto the adapter and which greatly reduces the risk of inadvertent unlocking.

To this end, the subject of the invention is a drive tool of the aforementioned type, characterized in that:

between the adapter and the main drive member there is freedom allowing a relative displacement that has a component along the axis of the adapter, and the main drive member is designed to unlock the locking mechanism simply under the effect of the relative displacement of this main drive member with respect to the adapter towards the distal end thereof.

The tool according to the invention may have one or more of the following features, taken in isolation or in any technically feasible combination:

the relative displacement is a translational movement along the axis of the adapter;

the tool further comprises an urging member, especially a spring, which tends to move the main drive member away from the distal end of the adapter;

the urging member tends to press the main drive member against a stop integral with the adapter;

the member urges the mechanism towards its locked position;

the locking mechanism comprises a catch, especially a ball, arranged in a duct of the adapter which opens onto the peripheral surface of this adapter; and a locking rod mounted to slide in a second duct essentially parallel to the axis of the adapter and in particular coaxial with this adapter, between a locked position, in which it keeps the catch projecting beyond the peripheral surface of the adapter, and an unlocked position, in which it allows the catch to retract into its duct; and the locking rod comprises a head which cooperates with the main drive member during the relative displacement;

the tool comprises a joint in which the main drive member is articulated about a pin secured to one of the two main members and passing at least through a slot in the other main member which is elongate in a direction parallel to the axis of the latter;

the head of the locking rod and the distal end of the main drive member comprise mating positioning parts designed to cooperate in at least one predetermined angular position of the main drive member with respect to the adapter, especially when this member and this adapter are aligned;

the positioning parts are male and female shapes designed to clip together, or magnets;

the tool comprises elastic straightening mechanism which tends to keep the axes of the main drive member and of the adapter parallel or concurrent;

the elastic straightening mechanism includes the urging member;

the head of the locking rod and the distal end of the main drive member comprise flats pressed onto one another when the main drive member is aligned with the adapter;

the joint forms a ball-type universal joint, the clearance on the machining of the slot of the ball defining the said freedom for relative displacement;

the joint forms a ball-type universal joint, the clearance on the machining of the slot of the ball being increased to define the freedom for relative displacement;

the joint is a simple joint of an articulated handgrip;

the joint is a simple joint of a Hooke's-type universal joint;

the joint is a swivelling polygon, especially a spherically-rounded hexagon;

the main drive member is a bar perpendicular to the axis of the adapter and mounted to slide, on the one hand, along its own axis and, on the other hand, along the axis of the adapter, in at least one slot of the adapter which is elongate in a direction parallel to the axis of the latter;

the main drive member is a bar perpendicular to the axis of the adapter and mounted to slide along its own axis through two slots in the adapter, one of which slots is elongate in a direction parallel to the axis of the latter;

the main drive member has a body which forms an extension bar, the length of which is greater than three times the diameter of its main section.

BRIEF DESCRIPTION OF THE DRAWINGS

Embodiments of the invention will now be described with reference to the appended drawings in which the various figures depict, in longitudinal section, various tools according to the invention. More specifically:

FIG. 3 depicts the ball-type universal joint in an aligned and unlocked position;

FIG. 4 depicts an alternative form of the ball-type universal joint of FIGS. 1 to 3;

FIG. 8 depicts a Hooke's-type universal joint in accordance with the invention, in an aligned position of rest;

FIG. 9 depicts an alternative form of the ball-type universal joint of FIGS. 1 to 3, in an aligned position of rest;

FIG. 10 is a similar view of another alternative form of a ball-type universal joint;

FIG. 11 depicts a sliding handgrip in accordance with the invention;

FIG. 12 depicts another alternative form of the ball-type universal joint of FIGS. 1 to 3, in an aligned position of rest;

FIG. 13 depicts an alternative form of the universal joint, which uses a spherically-rounded hexagon in accordance with the invention;

FIG. 14 depicts an alternative form of the universal joint of FIG. 10;

FIG. 15 depicts an extension with a ball-type universal joint according to the invention; and FIG. 16 depicts an alternative form of of the handgrip of FIG. 11.

DETAILED DESCRIPTION OF THE INVENTION

Figure 1:
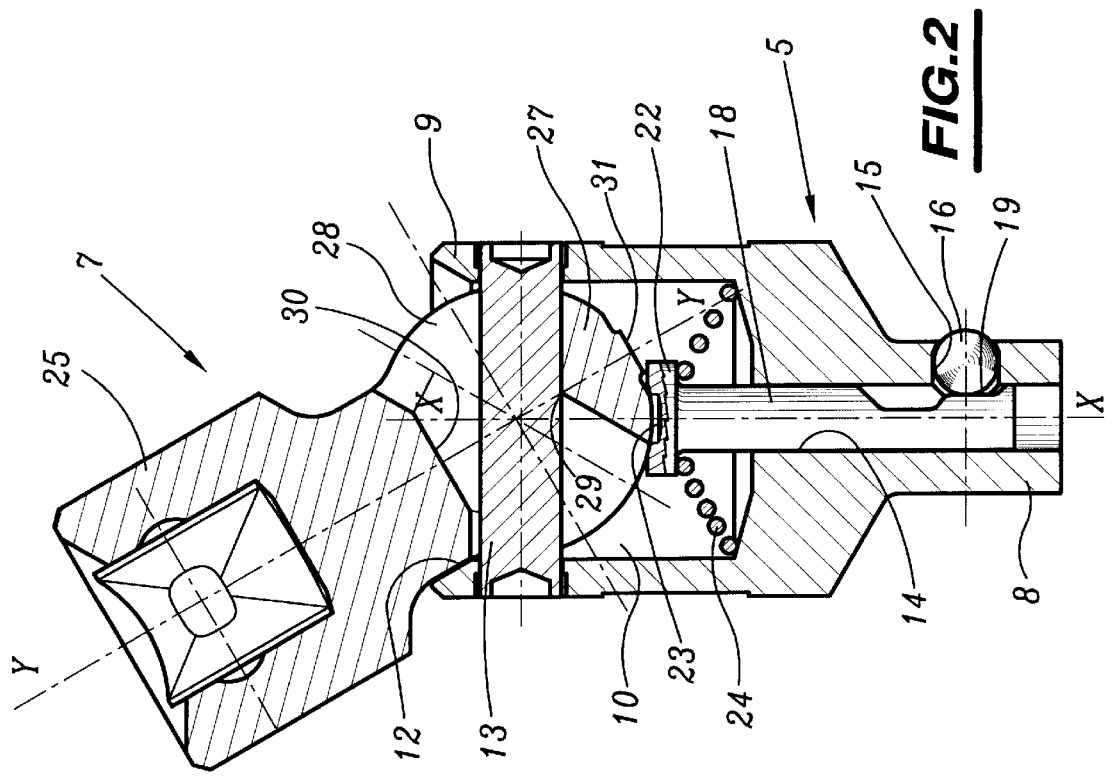
FIG. 1 depicts a ball-type universal joint in accordance with the invention, in an aligned position of rest.
Figure 2:
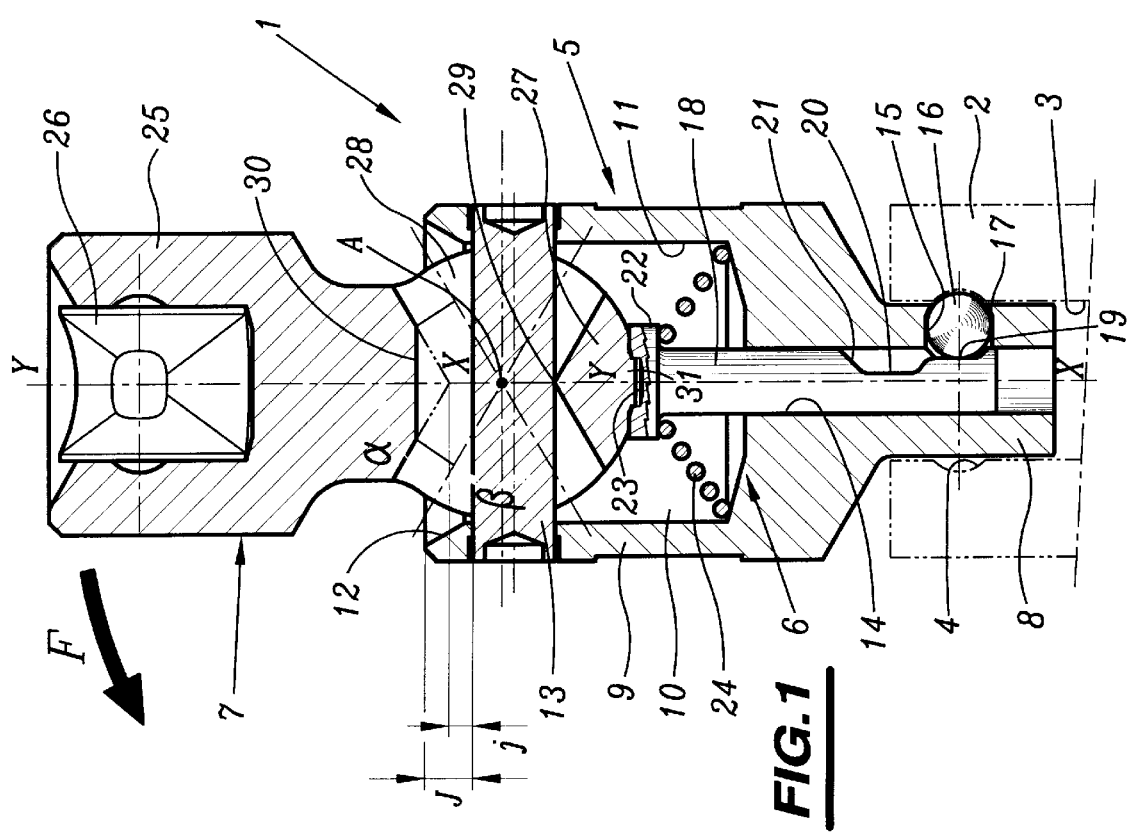
FIG. 2 depicts the same ball-type universal joint in a "broken" position.

FIGS. 1 to 3 depict a ball-type universal joint 1 intended to rotatably drive a socket 2 depicted in chain line in FIG. 1. The distal end (not visible in the drawing) of the socket has a driving profile such as a female hexagonal socket, intended to engage the head of a mating male hexagonal bolt. The proximal end of the socket has a female driving profile 3, for example a standardized square, in each face of which there is a spherical recess 4.

The ball-type universal joint 1 essentially consists of two main parts, namely an adapter 5 for coupling to the socket 2, this adapter being equipped with a mechanism 6 for locking it to the socket, and a main member 7 for driving the adapter.

For the convenience of the description, it will be assumed that the tool is orientated as in FIG. 1, that is to say with the axis X-X of the adapter arranged vertically and the distal end of the adapter facing downwards, and the member 7 located above the adapter.

The distal part of the adapter 5 forms a coupling head 8 which has a male profile that mates with the driving profile 3. The adapter is extended upwards by a driving body 9 which defines a cavity 10. The side wall 11 of this cavity is cylindrical with a circular cross section. The entrance to the cavity is chamfered at 12. Just below this chamfer, the adapter has a hinge pin 13 of circular section, secured to the body 9, and which passes diametrically across the cavity 10.

The adapter 5 furthermore comprises an axial duct 14 which opens into the bottom of the cavity 10 and onto the lower end face of the adapter, and a radial duct 15 which connects the duct 14 to the peripheral surface of the head 8. A ball 16 is arranged freely in the duct 15 and is prevented from escaping from it outwards by upsetting 17 performed at the exit of this duct. The latter is situated opposite the spherical recess 4 when the socket 2 is in place.

Furthermore, an operating rod 18 slides in the duct 14. This rod has, close to its lower end, a lateral recess which has a relatively shallow distal part 19 and a deeper proximal part 20. Each part 19, 20 has a flat bottom parallel to the axis X-X and is delimited by two surfaces such as 21 which are inclined with respect to this axis.

The upper end of the rod 18 forms an enlarged head 22. At the center of the upper face of this head there is a shallow recess 23. A conical helical spring 24 is compressed between the underside of the head 22 and the bottom of the cavity 10.

The main drive member 7, which in this embodiment is made as a single piece, comprises an upper body 25 with a female driving profile 26 which in this case is a standardized square identical to that of the socket 2. This body is extended downwards in the form of a spherical-swivel ball 27. The axis of the member 7 is denoted by Y-Y.

The ball 27 has passing through it a duct 28 which is obtained by making a bore of the same cross section as the pin 13, the axis of which meets the axis Y-Y at a point A and at an angle $\alpha$, and by pivoting the machine tool through an angle $\beta=180°-2\alpha$ in a diametral plane of the member 7, which is the plane of FIG. 1, about the point A. The duct 28 therefore has constant width, equal to the diameter of the pin 13, and widens on both sides at the angle $\beta$. The narrowest region of this duct is in the diametral plane of the member 7 perpendicular to the plane of FIG. 1 and forms an ellipse 29 with its major axis along the axis Y-Y.

Shown in chain line in FIG. 1, in the upper part of the duct 28, is the outline obtained in this way. As can be seen in solid line at 30, the cross section of the duct 28 has also been enlarged upwards by a machining of the same diameter as before but orientated horizontally.

Furthermore, the distal end of the ball 27 has a relief 31 centered on the axis Y-Y and which mates with the recess 23 of the rod 18.

When the tool 1 is in the aligned position of rest (FIG. 1), the relief 13 is accommodated in the recess 23. This position is stable because the spring 24 pushes the rod 18 upwards, and this brings the lowermost point of the ellipse 29 into contact with the pin 13.

In this position, there is, above the pin 13 and between this pin and the machined portion 30, an axial clearance J which is markedly greater than the clearance j that would result simply from machining at the angle $\beta$. In this example, the ratio J/j is close to 2.

In the same position, the lower flat 19 of the rod 18 faces the duct 15 of the adapter, and this locks the ball 16 so that it projects with respect to the coupling head 8 into the spherical recess 4 of the socket 2, making inadvertent uncoupling of the ball-type universal joint 1 from the socket 2 impossible.

The tool 1 can be used in its position of FIG. 1 to transmit torque without a change of axis from the member 7 to the adapter 5 by the cooperation of the flanks of the duct 28 and of the pin 13 of the adapter.

Torque may also be transmitted at a "break" angle. To achieve this, all that is required is for a tilting force, for example in the plane of FIG. 1, in the direction of the arrow F, to be exerted. As soon as this force reaches a certain value, the relief 31 pushes the rod 18 back over a short distance, compressing the spring 24, which allows it to leave the recess 23. Thus the position of FIG. 2 is reached, with a maximum "break" from the axis X-X that is determined by the geometry of the parts.

During this movement and in this position the ball 16 remains locked projecting from the coupling head 8 because the flat 19 remains facing the duct 15 of the adapter 5. The member 7, via its ball 27, transmits the torque to the other main member of the tool which consists of the adapter 5 equipped with its pin 13, in the same way as before.

To unlock the socket 2 in order to remove it from the adapter 5, the tool 7 is brought back onto the axis of the adapter, and pushed downwards (FIG. 3) to bring the machined portion 30 into contact with the pin 13. This axial displacement of amplitude J pushes the rod 18 downwards, compressing the spring 24, and brings the upper flat 20 of this rod to face the duct 15. The ball 16 is therefore free to retract fully into the coupling head 8, and this releases the socket 2. Return to the initial locked position takes place automatically as soon as pressure is released, under the action of the spring 24.

It will therefore be seen that this unlocking can be obtained without an additional unlocking member, simply by relative axial displacement of the main members 5 and 7 of the tool.

The arrangement thus described has other benefits.

On the one hand, to fit the socket on the adapter all that is required, with the tool in its aligned position of FIG. 1, is for the proximal end of the socket to be fitted onto the head 8 and pushed upwards, keeping the main drive member 7 stationary. The socket will therefore come into abutment against the ball 16, which is locked, and push the entire adapter back upwards. This will compress the spring 24 and move the ball upwards along the rod 18 until it comes to face the upper flat 20. Under the pushing effect exerted by the socket, the ball will then retract into the duct 15, leaving the socket to come up again under the pushing force exerted by the operator, and the socket will move down again under the action of the spring 24, until a recess 4 is in the position facing the duct 15. When the operator stops pushing, the socket 2 and the adapter 5 will then be able to move down again under the action of the spring 24 and the ball will again be locked. Thus the ball automatically clips into the recess 4 in the socket.

By contrast it is practically impossible for the socket to be unlocked inadvertently. This is because in order to unlock the socket the members 5 and 7 need to be brought closer together, compressing the spring 24, in order to release the ball, and the socket then needs to be pulled downwards. To perform these two opposing displacements, the operator needs to use both hands.

It will be understood that the spring 24 fulfils several different functions:

on the one hand, when the tool is in the aligned position, it takes up the axial play J between the main members 5 and 7;

on the other hand, it constantly returns the rod 18 to the locked position;

it makes it possible to obtain the clipping-together of portions 23 and 31, which can be released simply by deliberately "breaking" the tool. This clipping-together allows the socket 2 to be held temporarily locked on the adapter as depicted in FIG. 1, along the axis of the member 7, and therefore allows this socket easily to be offered up to a hexagon head that is to be turned, even in somewhat inaccessible spaces;

finally, by friction, it provides a braking effect in the "broken" position.

In the alternative forms described below, elements which are identical retain the same numerical references, while a suffix A, B, . . . is added to elements which correspond but which are modified.

The alternative form 1A in FIG. 4 differs from the previous one only in the shape of the clipping-together reliefs: the rod head 22A has an upper surface 23A which is spherical and convex and which cooperates with a mating concave spherical surface 31A made at the distal end of the ball 27A.

As an alternative, the clipping-together reliefs 23, 31 or 23A, 31A may be replaced by small magnets arranged at the end of the ball and on the head of the rod.

Figure 5:
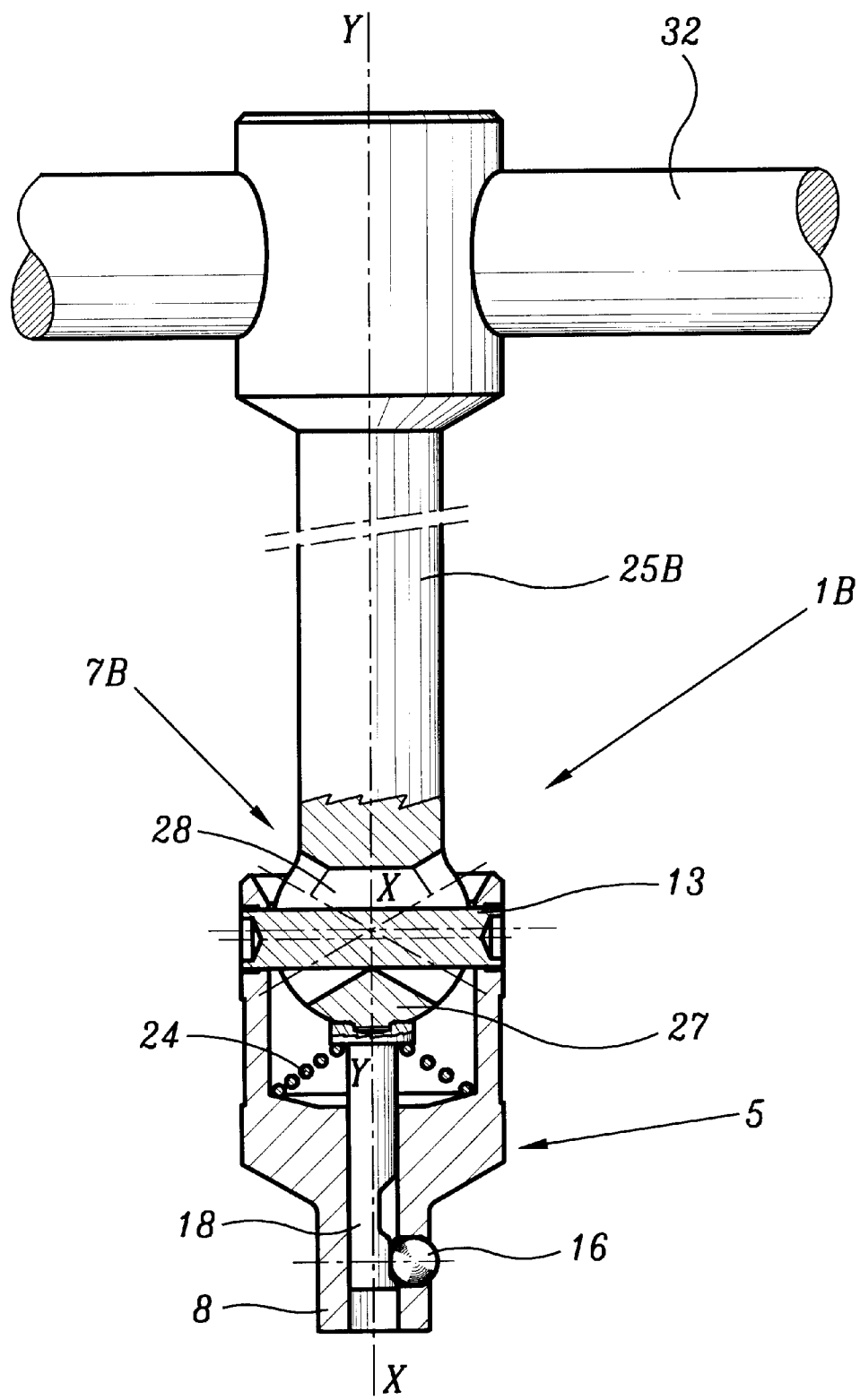
FIG. 5 depicts the application of the ball-type universal joint of FIGS. 1 to 4 to a long universally-jointed handgrip.

FIG. 5 depicts a tool 1B which differs from the tool of FIGS. 1 to 3 only by the fact that the body 25B of the member 7B forms a bar of axis Y-Y which at its proximal end has a stationary or radial handgrip 32 for rotational driving. The tool 1B therefore constitutes a long-handled universally-jointed tool.

Figures 6, 7:
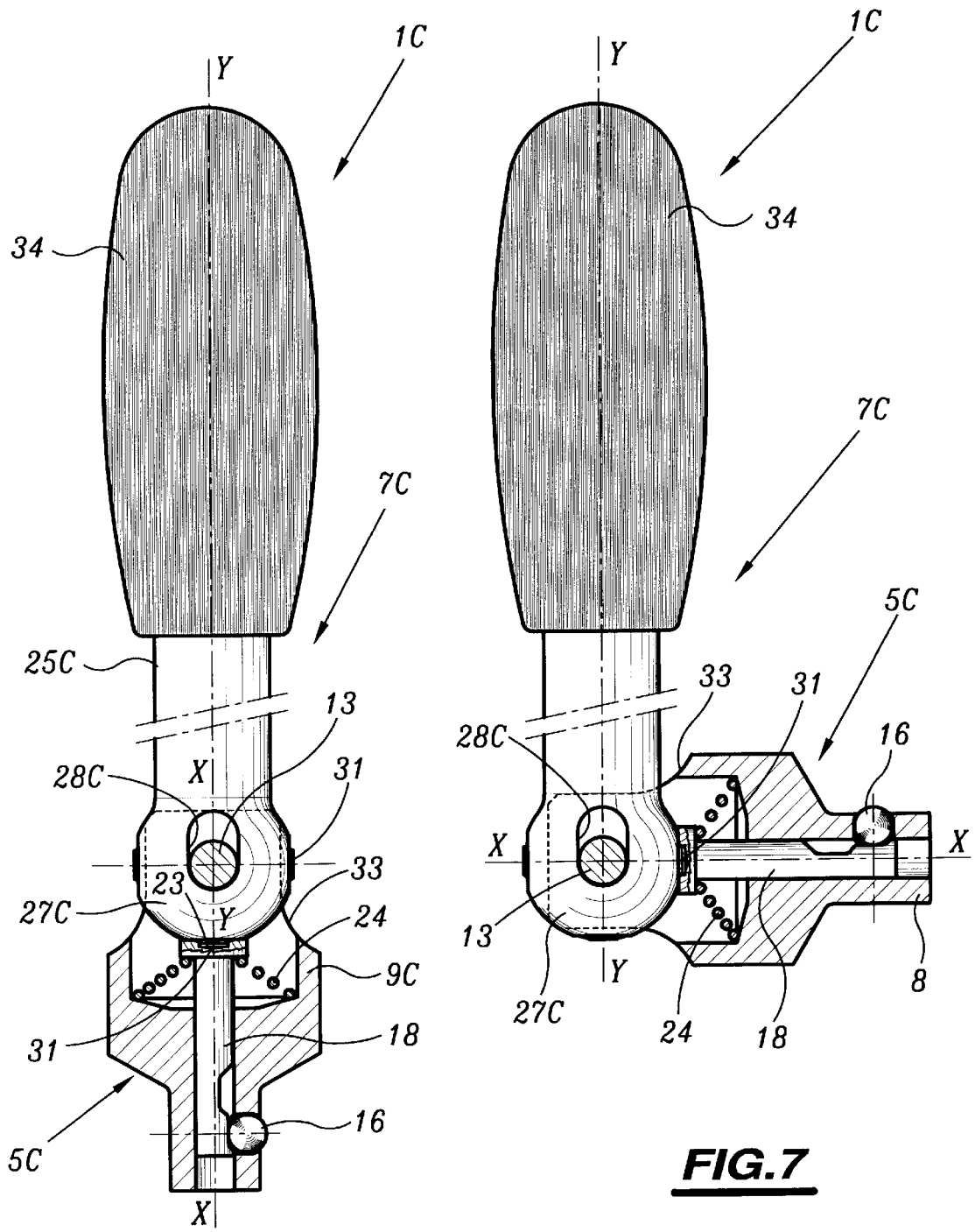
FIG. 6 depicts an articulated handgrip according to the invention, in a straight position.
FIG. 7 depicts the same articulated handgrip in a "broken" position.

FIGS. 6 and 7 illustrate the application of the invention to a simple jointed handgrip 1C. In this case, the body 9C of the adapter 5C is widely perforated at 33 on each side of the pin 13, starting from its proximal end, and the duct 28C of the ball 27C is a duct whose axis is parallel to this pin, and which has an oblong cross section along the axis Y-Y and which is the same width as the pin. Furthermore, the ball has two additional reliefs 31, situated 90° on each side of the distal end relief 31, and the body 25C of the member 7C has a straight handgrip 34. The other elements of the tool are identical to the corresponding elements in FIGS. 1 to 3.

The aligned position of rest is shown in FIG. 6. The end relief 31 cooperates with the recess 23 of the rod 18, and the spring 24 keeps the latter in a position that locks the ball 16 and the pin 13 pressed against the distal end of the duct 28C. Unlocking is achieved simply by pushing the handgrip 34 downwards.

In order to exert high screwing/unscrewing torques, the tool may be "broken" by releasing the clipping-together of portions 23 and 31 in the same way as before. In particular, it can be "broken" through 90° to make it adopt one or other of the stable positions defined by the other two reliefs 31 on the ball, as depicted in FIG. 7.

The embodiment 1D of FIG. 8 differs from the previous embodiment by the fact that the body 25D of the member 7D constitutes one half of a Hooke's-type joint. This Hooke's-type joint comprises, at its proximal end, another duct 35 of axis Z-Z perpendicular to the duct 28D, which gives the universal joint its second articulation about the axis Z-Z, via a second pin 36. The ends of the latter are accommodated in bores 37 of a yoke which forms part of a second drive body 38, which has a female socket 39 identical to the socket 26 of FIG. 1, intended to receive the driving torque.

The stable aligned position of the assembly is obtained by virtue of a second clipping-together of an auxiliary ball 40 which is loaded by a spring 41 and cooperates with a spherical recess 42 made at the proximal end of the half joint 25D.

The embodiment 1E of FIG. 9 differs from the embodiment of FIGS. 1 to 3 in two respects.

On the one hand, the locking mechanism is of the two-ball type: over its entire length, the rod 18E has a circular cross section with a smaller-diameter lower part 43 guided in a lower part 44, of corresponding diameter, of the duct 14E. An auxiliary ball 45, which is smaller than the ball 16 but of a larger diameter than the part 44, is arranged in a counter-bored end portion of the part 44 and is held against the end face of the rod by a weak spring 46.

Furthermore, the machined portion 30 in FIGS. 1 to 3 is omitted, which means that the axial play between the two main members 5E-13 and 7E is the aforementioned play j.

With such a two-ball locking mechanism, the play j is enough for the ball 16 to be unlocked in the same way as before.

FIG. 10 depicts an alternative form 1F of FIGS. 1 to 3, which differs therefrom only in the omission of the clipping-together of portions 23 and 31. Thus, the head of the locking rod 18F has a concave spherical upper surface 23F that mates with the ball 27.

In the embodiment 1G of FIG. 11, there is no clipping-together either. The rod head 22G is externally flat, or alternatively cylindrical and concave, and cooperates with a cylindrical sliding bar 7G perpendicular to the axis X-X and which passes through two opposing slots 47 on the body 9G of the adapter 5G. The width of these slots is the diameter of the bar 7G, and the slots are elongate in the vertical direction. The bar 7G thus forms the main drive member of the tool and has the vertical play J which allows it to unlock the ball 16 when the coupling adapter is displaced towards the bar.

The embodiment 1H of FIG. 12 differs from the embodiment of FIGS. 1 to 3 only in the fact that the distal end 48 of the ball 27H is flat and horizontal and extends over the entire area permitted by the duct 28H. It should be noted that, in this version, the play J has been further enlarged by providing a machined portion 30H at the upper part of the duct 28H. Furthermore, the head 22H of the rod 18H has a flat upper surface 49 with the same surface area as the surface 48.

Thus, irrespective of the angle of "break" of the ball-type universal joint, the spring 24 is constantly trying to align the axes X-X and Y-Y.

The same straightening effect is obtained in the case of the tool 1I of FIG. 13, where the cavity 10I is a female hexagon socket and the ball 27I is a spherically-rounded hexagon retained by a circlip 50 fitted at the entry to the cavity 10I.

It should be noted that in this version the adapter 5I has a four-lobed external profile 8I as described in WO-A-96/25 603 in the name of the Applicant company.

Alternative form 1J of FIG. 14 differs from the form in FIG. 10 in the following respects:

on the one hand, the duct 14J in the adapter is parallel to the axis X-X but offset from this axis. It is possible to envisage that this offset is by so much that the rod 18J becomes flush with the surface of the driving profile 8. To compensate for this offset, a second ball 16J, of smaller diameter than the ball 16, is inserted between the latter and the rod 18J, to supplement the locking mechanism 6J;

correspondingly, the head 22J of the rod has a modified shape so that its upper surface 23J still mates with the ball 27;

furthermore, the spring 24J is a hairpin spring compressed between the head 22J and the bottom of the cavity 10J.

Alternative form 1K of FIG. 15 differs from the form of FIGS. 1 to 3 only in the lengthening of the body 25K of the member 7K, starting from the ball 27, in the form of a bar, the length of which is greater than three times the diameter of its main section. The tool thus constitutes a ball-jointed extension.

Alternative form 1L of FIG. 16 differs from the form of FIG. 11 only in the fact that one of the slots in the adapter (the slot 47L on the left in the drawing) has a shape which surrounds the sliding bar 7L with a small amount of clearance. This clearance is just enough to allow the bar 7L to deflect through an angle in the slot 47L when the operator presses on the opposite part of the bar to this slot, as indicated by the arrow F. This movement, as before, displaces the rod 18L downwards and unlocks the ball 16.

What is claimed is:

1. Tool for driving a rotary element, the tool comprising two main members, namely:

an adapter for coupling to the rotary element, said adapter having an axis, a distal end and a proximal end and being equipped with a lock mechanism for locking and unlocking the coupling of said adapter to the rotary element, said lock mechanism being normally locked; and a main drive member for rotating the adapter; wherein:

between the adapter and the main drive member there is play allowing a relative displacement that has a component along the axis of the adapter, and the main drive member is designed to unlock the lock mechanism under the effect of said relative displacement of said main drive member with respect to the adapter towards the distal end of the adapter.

2. Tool according to claim 1, wherein said relative displacement comprises a translational movement along the axis of the adapter.

3. Tool according to claim 1, further comprising an urging means which tends to move the main drive member away from the distal end of the adapter.

4. Tool according to claim 3, wherein the urging means tends to press the main drive member against a stop integral with the adapter.

5. Tool according to claim 3, wherein the urging means urges the lock mechanism towards a locked position.

6. Tool according to claim 1, wherein the lock mechanism comprises:

a catch arranged in a first duct of the adapter which opens onto a peripheral surface of said adapter; and a locking rod mounted to slide in a second duct essentially parallel to the axis of the adapter, between a locked position, in which it keeps the catch projecting beyond the peripheral surface of the adapter, and an unlocked position, in which it allows the catch to retract into the first duct, and wherein the locking rod comprises a head which cooperates with the main drive member during said relative displacement.

7. Tool according to claim 6, wherein said catch comprises a ball.

8. Tool according to claim 6, wherein said second duct is coaxial with said adapter.

9. Tool according to claim 1, wherein said adapter and said main drive member are coupled together by a joint in which the main drive member is articulated about a pin secured to one of the two main members and passing at least through a slot in the other main member which is elongated in a direction parallel to the axis of said other main member.

10. Tool according to claim 6, wherein said adapter and said main drive member are coupled together by a joint in which the main drive member is articulated about a pin secured to one of the two main members and passing at least through a slot in the other main member which is elongate in a direction parallel to the axis of said other main member, wherein the head of the locking rod and the distal end of the main drive member comprise mating positioning means designed to cooperate in at least one predetermined angular position of the main drive member with respect to the adapter.

11. Tool according to claim 10, wherein said angular position is a position at which said main drive member is aligned with said adapter.

12. Tool according to claim 10, wherein the positioning means comprises male and female shapes designed to clip together.

13. Tool according to claim 9, comprising elastic straightening means which tend to keep the axes of the main drive member and of the adapter parallel or coincident.

14. Tool according to claim 10, comprising elastic straightening means which tend to keep the axes of the main drive member and of the adapter parallel or coincident.

15. Tool according to claim 4, comprising elastic straightening means which tend to keep the axes of the main drive member and of the adapter parallel or coincident, said elastic straightening means consisting of said urging means.

16. Tool according to claim 5, comprising elastic straightening means which tend to keep the axes of the main drive member and of the adapter parallel or coincident, said elastic straightening means consisting of said urging means.

17. Tool according to claim 6, comprising elastic straightening means which tend to keep the axes of the main drive member and of the adapter parallel or coincident, said elastic straightening means consisting of said urging means, the head of the locking rod and the distal end of the main drive member comprising flats pressed onto one another when the main drive member is aligned with the adapter.

18. Tool according to claim 9, wherein said joint forms a ball-type universal joint with said other main member comprising a ball, and wherein said slot of said other main member includes a machined portion for defining said ply for allowing the relative displacement.

19. Tool according to claim 9, wherein said joint forms a ball-type universal joint with said other main member comprising a ball, and wherein said slot of said other main member defines said ply for allowing the relative displacement.

20. Tool according to claim 9, wherein said joint comprises a simple joint of an articulated handgrip.

21. Tool according to claim 9, wherein said joint comprises a simple joint of a Hooke's-type universal joint.

22. Tool according to claim 9, wherein said joint comprises a swivelling polygon.

23. Tool according to claim 1, wherein the main drive member comprises a bar having a bar axis perpendicular to the axis of the adapter and mounted to slide along said bar axis relative to said adapter and also to undergo said relative displacement along the axis of the adapter, in at least one slot of the adapter which is elongate in a direction parallel to the axis of said adapter.

24. Tool according to claim 1, wherein the main drive member comprises a bar having a bar axis perpendicular to the axis of the adapter and mounted to slide along said bar axis through two slots in the adapter, one of which slots is elongate in a direction parallel to the axis of said adapter.

25. Tool according to claim 1, wherein the main drive member has a body which forms an extension bar and which includes a main section, and a length of said extension bar is greater than three times a diameter of said main section of said extension bar.

26. Tool according to claim 10, wherein the positioning means comprise magnets.

27. Tool according to claim 1, further comprising a spring urging said main drive member away from the distal end of the adapter.

* * * * *